United States Patent Office 3,337,305
Patented Aug. 22, 1967

3,337,305
PURIFYING CAUSTIC ALUMINATE SOLUTIONS WITH AMMONIA
Alva C. Byrns, Lafayette, Calif., assignor to Kaiser Aluminum & Chemical Corporation, Oakland, Calif., a corporation of Delaware
No Drawing. Filed May 13, 1964, Ser. No. 367,233
9 Claims. (Cl. 23—300)

This case relates to the purification of the alkaline solutions resulting from the dissolution of bauxite with concentrated sodium hydroxide solution in the Bayer process. More particularly the invention relates to purification by crystallizing dissolved salts in a manner which renders the separation of salts from the salt-liquor slurry resulting from dissolution of ore easy and rapid. The invention has particular utility in the separation of vanadate and oxalate salts from spent Bayer liquors, commonly referred to as "spent caustic liquor."

Conventional Bayer plant processing involves the recirculation of concentrated sodium hydroxide solutions from which alumina values have been removed, i.e. spent liquor, and the use of these liquors, to accomplish further dissolution of fresh bauxite ore. Generally, some alumina remains in the recycled or "spent" liquor as sodium aluminate since not all the alumina is removed. In the specifications and claims the term "caustic aluminate" or "caustic aluminate solutions" is intended to refer to alkaline solutions containing alkaline components principally as sodium hydroxide and alumina values principally as sodium aluminate.

In the operation of the Bayer process the recirculated sodium hydroxide liquors become contaminated with a variety of salts, both inorganic and organic. Contaminants are introduced into the liquor from the bauxite ore as well as from nonbauxite sources by precipitation and reaction. The bulk of the contaminating salts is, however, derived from the bauxite undergoing dissolution and as such is a constant problem in the Bayer processes. Sodium carbonate and sodium phosphate are the most common salts derived from the bauxite which contaminate the caustic liquor. Concentration of these salts, however, can be controlled by the addition of lime to the caustic liquor. Other inorganic salts, such as sodium silicate, zincates, chromates and gallates, are maintained at a low level of concentration by the natural chemistry of the system or are removed as impurities in the alumina product. Some salts, such as sodium chloride, sulfate or fluoride, are introduced into the caustic liquor, but their concentration can be limited by control of their introduction from their sources.

Unfortunately, certain salts tend to accumulate in plant liquors in appreciable concentrations, e.g. more than one g./l., and among these, the more deleterious are vanadates and oxalates. These salts, for example sodium vanadate and sodium oxalate, are quite difficult to remove from the liquor and, if allowed to concentrate appreciably in the process, will contaminate the alumina product. Such alumina contamination is extremely undesirable in subsequent processing for the production of metallic aluminum. Moreover, some of the salts, e.g. the oxalate and vanadate compounds, can have significant independent value when recovered and purified.

A number of the salts contaminating the Bayer liquor can be removed by "salting out" from the caustic aluminate plant liquor at concentration of over 400 g./l. caustic soda at elevated temperatures. However, vanadate salts only crystallize out of solution upon cooling to room temperature or lower. The oxalate may be removed by crystallization at somewhat lower concentrations and higher temperatures. In the relatively simple Bayer liquors treated in certain European plants, the vanadate is recovered as a complex hydrated salt which contains phosphate, arsenate and the fluoride. The technique of salting out by evaporation and concentration has proven to be an impractical one on the plant liquors of domestic Bayer plants. At least part of the reason for the difficulty in employing the simple evaporation technique in U.S. Bayer plants results from the nature of the bauxite material being treated. Bayer plant liquors in U.S. alumina plants are characterized by a considerable concentration of noncaustic salts including oxalates, humates, other organates, etc. This large concentration of noncaustic salts in the liquor results from the process conditions as well as from the use of bauxites of more complex compositions. It has been determined by extensive testing of domestic Bayer plant liquors that the relatively simple technique of desalting by evaporation and cooling to room temperature produces a product which is an unmanageable gelatinous slurry. This slurry is in a form which makes separation of solids extremely difficult, if not impossible. For example, when it is attempted to recover vanadate as a complex hydrated salt by evaporation, one obtains a viscous mixture with large quantity of finely divided solids dispersed in the liquor. The high viscosity of the suspension makes separation of solids impractical. Moreover, filtration of the viscous mass is so slow as to also be impractical and even centrifugation gives only partial separation of solids in liquor.

It has now been discovered that the above difficulties in separating the contaminating salts from the caustic liquors used in Bayer process can be avoided and that the potentially valuable salts, such as vanadate and oxalate salts, can be conveniently and practically removed by treating the liquor containing impurities according to the process of the invention. Moreover, by practicing the invention, the salts may be crystallized from the liquor in a form and in a manner such that the separation from the liquor is performed very easily. The method according to the invention involves the addition of ammonia to the caustic liquor containing vanadate and oxalate forms. The ammonia may be added in amounts up to 30% by weight of the liquor treated. The process has particular utility in removing oxalates and vanadates from the caustic aluminate solutions having a concentration in the range of 180–350 g./l. caustic soda before treatment. Typical solutions of the type described are Bayer process spent liquor streams, i.e. highly alkaline solutions from which a major amount of alumina values have been removed. The term "caustic soda," refers to the sum of the free sodium hydroxide and that combined with alumina expressed as equivalent sodium carbonate. The temperature of salt crystallization may vary from 0°–60° C. The method has the advantage of significant flexibility and allows for the removal of better than 90% of the difficult-to-remove vanadate and oxalate salts. Removal of over 95% of some of the salts is easily achieved by practicing the invention.

Skilled Bayer plant operators attach great importance to the consideration of caustic in the various stages of the process. It is the "caustic soda" which represents the working component in the Bayer plant system, i.e., the caustic soda serves the useful purpose of dissolving alumina values from the raw bauxite ore. Accordingly, a description of the quantity of salts, e.g., vanadates, oxalates, etc. in terms of a ratio to the caustic soda component is more meaningful than simply representing the quantity of these salts on a concentration basis since the changes in salt content can thereby be reflected independent of changes in concentration brought about by water removal. Moreover, representation of the salt content by ratio reveals the quantity of the salt in the plant inventory of caustic soda liquor on an absolute basis. Accordingly, the change in ratio (salt/caustic soda) gives the quantity of salt removed upon treating a portion of the liquor containing a known quantity of caustic soda.

For this reason the quantity of salts and the description and discussion of the ammoniation treatment to remove the salts will be described with respect to the ratio of salt to caustic soda wherein caustic soda is given the above definition, i.e., the value of free sodium hydroxide and the soda combined as sodium aluminate calculated in terms of the equivalent sodium carbonate. The term "total soda" or TS, as used herein, refers to the sum of the caustic soda or CS and sodium carbonate.

The process of the invention accomplishes purification of alkaline aluminate solutions as well as the removal and/or recovery of the potentially valuable salts, etc., sodium vanadate and sodium oxalate, from contaminated Bayer process liquors. The ammonia treatment also removes a portion of the sodium carbonate and other salts contained in the liquor. Removal of sodium carbonate and the other salts is advantageous in the purification of caustic aluminate solutions of the type used and produced in the Bayer process.

The following examples illustrate the effectiveness of the ammonia treatment to crystallize salts from solution in a form which enables the salts to be easily separated.

*Example A*

An alkaline aluminate solution having a concentration of 450 g./l. caustic soda was filtered at about 100° C. with some salts (mainly sodium carbonate) removed and then cooled for about two hours to 40° C. to form additional salt crystals which were also removed after filtration. The slurry was thereafter cooled to room temperature and allowed to stand for several days. The vanadate and other salts were then finally filtered at room temperature by vacuum filtration. The final filtration of the gelatinous salt slurry could be performed at a maximum rate of 1.5 gallons/ft.$^2$ per hour.

Further tests on filtration of concentrated liquors which had first been filtered at 100° C. and again filtered at 40° C. before cooling to room temperature and held for several days, gave rates of about 1.7 to 2 gallons/ft.$^2$ per hour on alkaline solutions of an initial caustic soda concentration of 400 g./l.

*Example B*

An alkaline aluminate liquor having a caustic soda concentration of 256.6 g./l. was treated at 5° C. with ammonia according to the invention for the purpose of desalting. The amount of ammonia used was a weight ratio of ammonia/liquor of 0.137. The resulting salt-liquor slurry was satisfactorily filtered at a rate of 13 gallons/ft.$^2$ per hour.

Examples A and B show that despite the advantage of three independent filtrations on the liquor which was desalted by evaporation (two at relatively high temperatures where filtration is generally easier), the final filterability of the salt slurry wherein salt was crystallized out of solution according to the invention (Example B), was seven times better than the filterability of the evaporated and cooled salt slurry. Moreover, in Example A wherein the salt was crystallized by cooling and evaporation, the filter cake was removed after each of the first two filtration cycles at 100° C. and 40° C. Thus, the resulting filter cake was thinner than the filter cake in Example B and although the filtration rate should ordinarily be improved with a thinner filter cake, the filterability of the salt slurry produced according to the invention was vastly superior.

Table I illustrates further the improved filterability of ammonia desalted liquors. Starting with essentially the same solutions, the ammoniation treatment makes it possible to improve filterability from about 6 to 7.5 times the rate obtainable with solutions desalted by evaporations.

TABLE I.—FILTRATION RATES FOR LIQUORS DESALTED BY EVAPORATION AND BY AMMONIATION

| Time, hrs. | Evaporated, gal./ft.$^2$/hr. | Ammoniated, gal./ft.$^2$/hr. | Improvement Ratio |
|---|---|---|---|
| 0.05 |  | 32.5 |  |
| 0.15 | 3.8 | 22.0 | 5.8 |
| 0.25 | 2.8 | 16.5 | 5.9 |
| 0.35 | 2.3 | 14.0 | 6.1 |
| 0.50 | 1.9 | 11.5 | 6.1 |
| 0.75 | 1.4 | 10.0 | 7.1 |
| 1.00 | 1.2 | 9.0 | 7.5 |
| 1.75 | 1.0 |  |  |

It has been determined that ammonia can be used to effect the removal of as much as 95% of oxalates and vanadates present as contaminants in Bayer plant caustic solutions. Moreover, the ammoniation treatment can be successfully used with relatively small quantities and ammonia and without crystallizing solid sodium hydroxide from the concentrated solution or losing any of the alumina values by crystallization of sodium aluminate. Thus, a selective removal of the undesirable salts from the concentrated sodium hydroxide can be obtained using relatively small quantities of ammonia without precipitating or crystallizing sodium hydroxide or suffering loss of alumina values, and while avoiding the formation of two-liquid phases.

In addition to improving the filterability and separability of the salt slurry, the ammonia treatment allows very high salt recovery. Table II summarizes the results of four examples, and illustrates the high yields which can be obtained by practicing the invention. In addition to the economic benefits derived from recoveries of better than 75% of vanadate and oxalate, the ammonia treatment has the advantage of removing significant amounts of sodium carbonate and organate salts present in the caustic aluminate solution. Since this carbonate is present in much greater quantitative amounts, e.g. about ten times as much as the vanadate oxalate, the absolute quantity of sodium carbonate crystallized out of solution is greater than the quantity of vanadate and oxalate. However, the percentage of the carbonate removed may be much less than the percentage of vanadate and oxalate removed. Thus, while 60–95% of the vanadate and oxalate is easily removed, only ¼ to ¾ of the carbonate in the original liquor may be concurrently crystallized from the solution. The removal of carbonate through the use of ammonia may be desirable under some circumstances. However, the carbonate in Bayer liquors is conventionally controlled by the addition of lime to the caustic solutions or by salting from hot concentrated liquors by evaporation and cooling. Other salts that are removed by the addition of ammonia are the sodium salts of carboxylic acids other than oxalate. The removal of such salts can also be beneficial to the purification of the liquor.

The four examples further demonstrate the fact that high recoveries and improved separability of the salts crystallized from solution are achieved without any loss of alumina values from the alkaline aluminate solution as well as without any loss of caustic. The flexibility of the invention is evidenced by the use of temperatures up to 60° C. with satisfactory results in all cases. The ammonia treatment can be applied successfully to caustic solutions in which the caustic concentration is only 200–300 g./l. caustic soda. Thus, the procedure is readily applicable to treatment of caustic liquors commonly used and resulting from Bayer process operation. The addition of ammonia leaves a non-viscous mobile liquid which is easily filtered.

TABLE II

| | Initial Conc. as Wt. Ratio Salt/C.S. | Final Conc. as Wt. Ratio Salt/C.S. | NH$_3$ Conc. Wt. Ratio NH$_3$/Liq.[b] | Temp., °C. | C.S.[a] | Percent Removed |
|---|---|---|---|---|---|---|
| Example I: | | | | | | |
| V$_2$O$_5$ | 0.0036 | 0.000078 | 0.186 | 5 | 286.5 | 97.8 |
| OxS[c] | 0.0132 | 0.0027 | 0.186 | 5 | 286.5 | 79.6 |
| Carb. S.[d] | 0.201 | 0.057 | 0.186 | 5 | 286.5 | 71.6 |
| Org.[e] | 0.141 | 0.120 | 0.186 | 5 | 286.5 | 15 |
| Al$_2$O$_3$ | 0.33 | 0.33 | 0.186 | 5 | 286.5 | |
| Example II: | | | | | | |
| V$_2$O$_5$ | 0.0041 | 0.000144 | 0.15 | 25 | 239.6 | 96.5 |
| OxS | 0.0136 | 0.0031 | 0.15 | 25 | 239.6 | 77.2 |
| Carb. S | 0.201 | 0.095 | 0.15 | 25 | 239.6 | 52.7 |
| Org | 0.178 | 0.128 | 0.15 | 25 | 239.6 | 28 |
| Al$_2$O$_3$ | 0.34 | 0.34 | 0.15 | 25 | 239.6 | |
| Example III: | | | | | | |
| V$_2$O$_5$ | 0.0048 | 0.00059 | 0.157 | 38 | 237.0 | 87.7 |
| OxS | 0.0143 | 0.0029 | 0.157 | 38 | 237.0 | 79.7 |
| Carb. S | 0.259 | 0.125 | 0.157 | 38 | 237.0 | 51.7 |
| Org | 0.139 | 0.120 | 0.157 | 38 | 237.0 | 13.5 |
| Al$_2$O$_3$ | 0.34 | 0.34 | 0.157 | 38 | 237.0 | |
| Example IV: | | | | | | |
| V$_2$O$_5$ | 0.0051 | 0.0013 | 0.163 | 60 | 252.8 | 74.5 |
| OxS | 0.0136 | 0.0011 | 0.163 | 60 | 252.8 | 91.9 |
| Carb. S | 0.220 | 0.059 | 0.163 | 60 | 252.8 | 73.2 |
| Org | 0.156 | 0.90 | 0.163 | 60 | 252.8 | 42.3 |
| Al$_2$O$_3$ | 0.34 | 0.34 | 0.163 | 60 | 252.8 | |

[a] C.S. refers to the sum of free sodium hydroxide and soda combined as sodium aluminate calculated as equivalent sodium carbonate.
[b] Amount of ammonia which is expressed as a weight ratio of NH$_3$ to the initial liquor.
[c] OxS refers to oxalate soda which is the sodium oxalate component calculated as equivalent sodium carbonate.
[d] Carb. S. refers to carbonate soda or Na$_2$CO$_3$.
[e] Org. refers to a measure of the organic content in terms of the amount of sodium associated with salts of various organic acids calculated as equivalent sodium carbonate.

The optimum amount of ammonia useful for salt removal is a function of the solutions NaOH concentration and of the temperature. Preferably, ammonia is added to a concentration in the final solution in the range of 10–30% by weight of the liquor treated. Also, it has been discovered that the required time for holding the solution to complete crystallization is considerably less with the higher temperature solution, e.g. 25°–60° C. than with cooler solutions. By varying the conditions of temperature and ammonia concentration, it is possible to obtain satisfactory crystallization of the oxalate and vanadate salts in less than an hour holding time. In all cases, however, it is very important that the amount of ammonia added be less than the amount which would cause either sodium aluminate or solid NaOH to come out of solution. Care should also be exercised to avoid adding so much ammonia that a two-liquid phase system is provided. The optimum amount required for the substantial removal of both vanadate and oxalate salts will vary with the concentration of the liquor being treated. The liquors of higher concentrations will require the use of a smaller percentage of ammonia and correspondingly smaller quantities of ammonia per weight of salts removed. The Bayer caustic solution stream can be treated in the form available from the Bayer process operation without further treatment thereof. The temperature of the treated liquor may be in the range of 0°–60° C. but preferably as cool as conveniently available. The heat of condensation and heat of mixing of the ammonia is relatively high and this heat must be removed from the system. The removal of heat can be accomplished either by indirect cooling of the mixture or by evaporation of added liquid ammonia. The particular method of removing heat will be determined by economic considerations since any satisfactory mode of removing heat can be conveniently employed. As an illustration, if heat removal is accomplished using water with indirect-liquid heat exchange and a temperature of about 38° C., somewhat more ammonia would be required, e.g. on the order of 20% by weight of the liquor treated. If, however, the cooling were performed by evaporation of liquid ammonia, in which a lower temperature, e.g. about 5° C., were provided, then a correspondingly lower amount of ammonia on the order of 10–15% by weight of liquor would be used.

It has also been found by tests at 5° C., 25° C., 38° C. and 60° C. that the devanadation is better at lower temperatures than at higher temperatures but the removal of organic compounds such as the oxalate is better at higher temperatures. It has also been discovered that liquid and gaseous ammonia may be used without any difference in results. However, where liquid ammonia is used, the liquor is cooled and the absorption of gaseous ammonia gives a hot solution which must be cooled. Cooling, as indicated above, can be accomplished either by evaporation of ammonia or indirectly by cooling coils.

As discussed above, valuable salt components, e.g. the oxalate and vanadate compounds, can, if desired, be recovered from the salt crystallized out of the caustic aluminate solution and thereafter purified. The salts can be recovered and purified by any convenient method well known in the art. One method of separation, for example, is by fractional crystallization; another is by the formation of complex salts. Recovery and purification of the salt components can be by either batch or continuous operation.

Similarly, the ammonia used to cause crystallization of the salts from the caustic aluminate solution can be recovered by means known in the art for recovering ammonia from water or alkaline solutions. Simple recovery means such as heating the ammoniated solution to the boiling point and injecting small amounts of steam either at atmospheric pressure or under a vacuum can cause the substantially quantitative recovery of ammonia thereby minimizing the cost of operation of the process.

It is also recognized that the salt crystallization process according to the invention can be operated either in a batch operation or a continuous stream with ammonia recycled for reuse. Another operational alternative is to withdraw only a portion of the Bayer stream for salt re-

What is claimed is:

1. In a process for purifying caustic aluminate solutions containing dissolved salts including oxalates and a salt selected from the group consisting of vanadate, carbonate and other organate salts in addition to oxalate wherein said salts are caused to be crystallized out of said solution, the improvement comprising introducing ammonia to said aluminate solution in an amount to cause crystallization of said salts without causing crystallization of solid sodium hydroxide and sodium aluminate, thereby producing a salt slurry from which the salts are readily separable, and separating said crystallized salts from said caustic aluminate solution.

2. An improved process according to claim 1 wherein said crystallization of salts by ammonia addition takes place at a temperature up to about 60° C.

3. An improved process according to claim 1 wherein ammonia is added to a final concentration of up to about 30% by weight of the caustic aluminate solution.

4. An improved process according to claim 1 wherein said crystallized salts are separated from said solution by filtration.

5. An improved process according to claim 1 wherein said crystallized salts are separated from said solution by centrifuging.

6. In a process for purifying caustic aluminate solutions containing dissolved salts including oxalate and a salt selected from the group consisting of vanadate carbonate, and other organate salts in addition to oxalate wherein said salts are caused to be crystallized out of said solution, the improvement comprising introducing ammonia to said aluminate solution in an amount to cause crystallization of said salts without causing crystallization of solid sodium hydroxide and sodium aluminate and to produce a slurry from which the salts are readily separable, separating said crystallized salts from said caustic aluminate solution, and recovering ammonia.

7. In a process for purifying caustic aluminate solutions containing dissolved vanadate and oxalate salts wherein said salts are caused to be crystallized out of said solution, the improvement comprising introducing ammonia to said aluminate solution in an amount to cause crystallization of said vanadate and oxalate salts without causing crystallization of solid sodium hydroxide and sodium aluminate, thereby producing a slurry from which the oxalate and vanadate salts are readily separable, and separating said crystallized salts from said caustic aluminate solution.

8. An improved process according to claim 7 wherein said oxalate and vanadate salts are recovered and purified after separation from the caustic aluminate solution.

9. An improved process according to claim 7 wherein ammonia used to crystallize said oxalate and vanadate salts is recovered from said caustic aluminate after separation of said oxalate and vanadate salts.

References Cited
UNITED STATES PATENTS

| | | | |
|---|---|---|---|
| 1,157,436 | 10/1915 | Spence | 23—52 |
| 1,510,046 | 9/1924 | Doibcan | 23—300 |
| 2,285,299 | 3/1940 | Muskat | 23—300 |
| 2,440,378 | 9/1946 | Newsome | 23—300 |
| 2,612,435 | 9/1952 | Perrin | 23—52 |
| 3,120,996 | 2/1964 | Porter | 23—52 |

NORMAN YUDKOFF, *Primary Examiner.*

G. HINES, *Assistant Examiner.*

UNITED STATES PATENT OFFICE
CERTIFICATE OF CORRECTION

Patent No. 3,337,305                          August 22, 1967

Alva C. Byrns

It is certified that error appears in the above identified patent and that said Letters Patent are hereby corrected as shown below:

Column 1, line 65, for "concentration" read -- concentrations --; column 3, line 49, for "miximum" read -- maximum --; column 4, line 27, for "and" read -- of --.

Signed and sealed this 15th day of July 1969.

(SEAL)
Attest:

Edward M. Fletcher, Jr.                    WILLIAM E. SCHUYLER, JR.
Attesting Officer                             Commissioner of Patents